Figure 1:
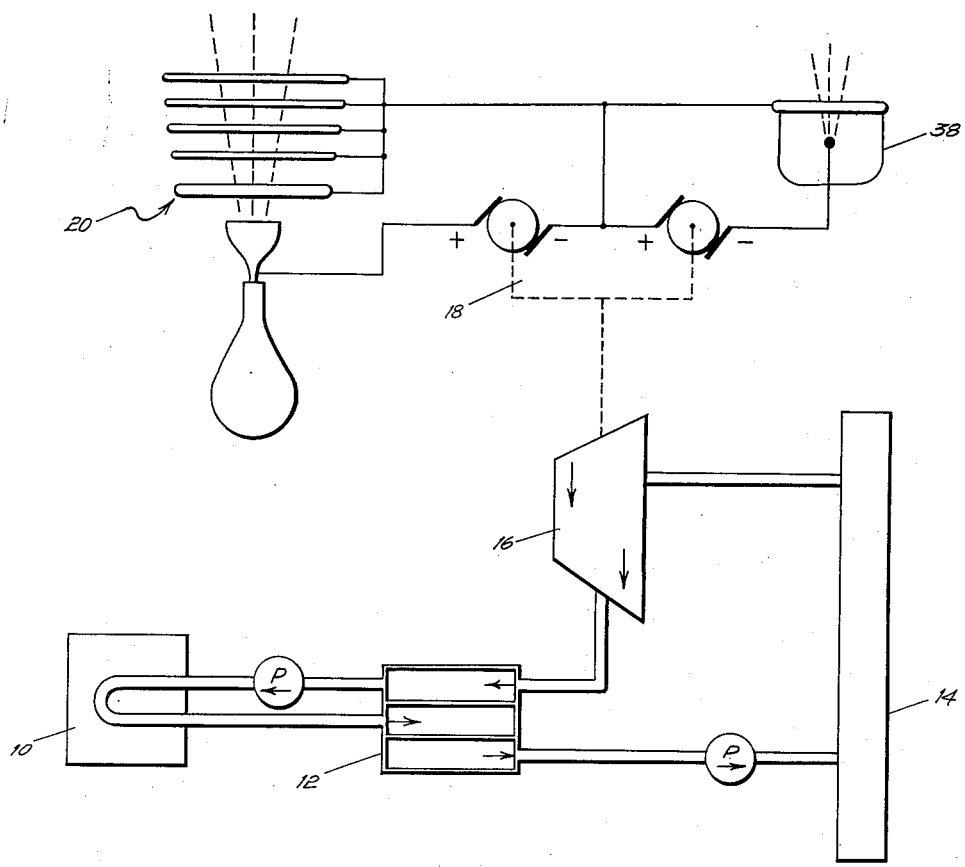

Feb. 11, 1964    D. M. P. GIGNOUX    3,120,736
METHOD AND APPARATUS FOR COLLOIDAL PROPULSION
Filed May 29, 1961    2 Sheets-Sheet 1

INVENTOR
DOMINIQUE M.P. GIGNOUX
BY John Gibson Semmes
ATTORNEY

United States Patent Office 3,120,736
Patented Feb. 11, 1964

3,120,736
METHOD AND APPARATUS FOR COLLOIDAL PROPULSION
Dominique M. P. Gignoux, Washington, D.C., assignor to Cosmic, Inc., Washington, D.C., a corporation of Delaware
Filed May 29, 1961, Ser. No. 113,345
16 Claims. (Cl. 60—35.3)

The present invention is related to space vehicles, particularly a propulsion system for space vehicles.

Since space vehicles operate outside of the earth's gravity, their propulsion systems can utilize a very low thrust, giving the vehicle an acceleration of $10^{-3}$ to $10^{-2}$ g. The prime energy source would be, in the present state of the art, a nuclear reactor and a turbine driving an electromagnetic or electrostatic generator. Such a propulsion system is intended for missions for which a low thrust and a long duration are required. For example, such a system would be capable of carrying large payloads from an orbit around one planet to an orbit around another planet, whereas a high thrust system, e.g. chemical rocket engines, would be used for landings and take-offs. It is now recognized that electric propulsion systems are likely to be the solution to long range space travel.

The present invention concerns an electrical propulsion system in which the electrically charged bodies producing the thrust are colloidal particles. The colloidal particles originate and are charged on a nozzle due to the action of an electric field generated by extracting electrodes. These colloidal particles are thereafter accelerated to a high speed by an electric field produced by a series of accelerating electrodes. Calculations accomplished by several authors have shown that the colloidal particles must have, after they are expelled from the ship, a velocity which has a well defined value for each particular mission and vehicle design. Should the velocity differ from this value, the efficiency of the system is greatly impaired. Since all colloidal particles are accelerated by the same voltage, it is important that all particles have substantially the same charge-to-mass ratio, so as to impart substantially the same velocity. Colloidal propulsion systems presently under development have been reported to provide particles of charge-to-mass ratios varying in a ratio of one hundred to one within the stream of particles, and to have an average charge-to-mass ratio so small that accelerating voltages of several megavolts would be required.

Accordingly, it is an object of the present invention to provide a source of colloidal particles having substantially the same charge-to-mass ratio.

Yet another object of invention is to provide a method for producing colloidal particles with a high enough charge-to-mass ratio to make possible operation with voltages of one megavolt or lower.

Yet another object of invention is to provide a method for introducing propellant into a space vehicles thrust area by centrifugal, as well as by electrical forces.

Yet additional objects of invention will become apparent from the ensuing specification and attached drawings wherein:

FIG. 1 is a schematic representation of the present propulsion system 20, as powered by a nuclear reactor 10, heat exchanger 12, radiator 14 and turbine 16 driving generator 18.

Figure 2:
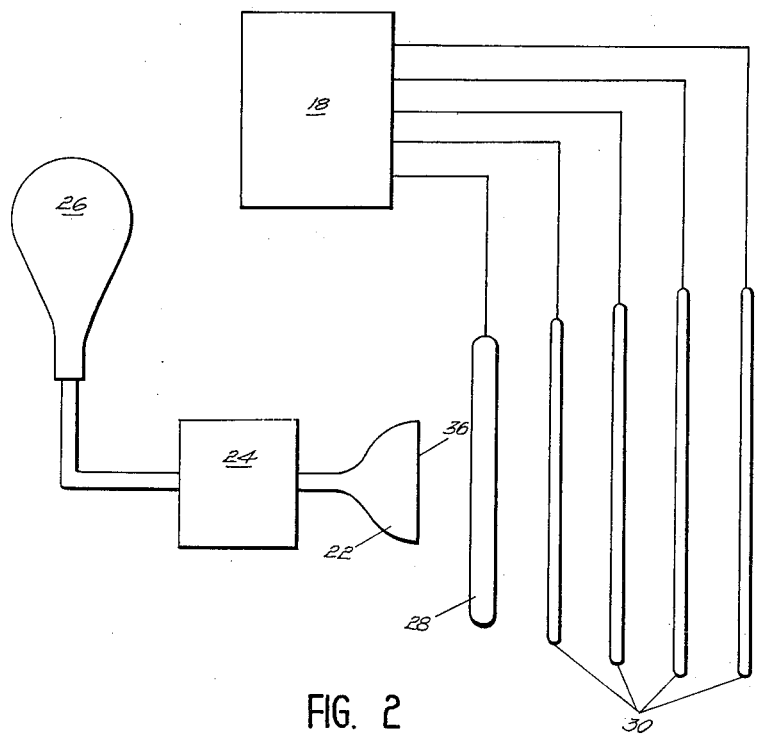

FIG. 2 is an enlarged side elevation of a rotating nozzle 22 powered by motor 24 introducing propellant liquid from reservoir 26 into one end of a thrust chamber with extracting electrode 28 and accelerating electrodes 30 co-axially positioned within said chamber apart from said rotating nozzle.

Figure 3:
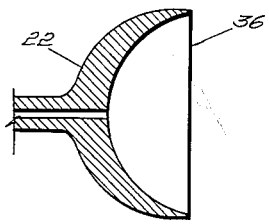
Figure 4:
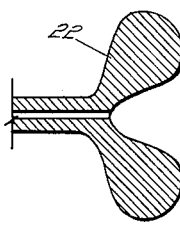
Figure 5:
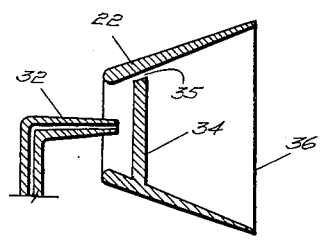

FIGS. 3 through 5 are vertical cross sectional views showing modifications in nozzle design, the FIG. 5 nozzle providing propellant liquid supply independently of the shaft rotating the nozzle by means of supply channel 32 positioned adjacent nozzle plate 34 having peripherial apertures 35 for introduction of propellant to the inside or nozzle 22.

In FIG. 2 cup-like nozzle 22 rotating at high speed provides for the centrifugal introduction of a thin continuous film of propellant liquid onto the nozzle edge 36. The relation between nozzle diameter and rotating speed is such that centrifugal forces attain a high value, for example on the order of one thousand times gravity. Vibration of nozzle 22 is to be avoided, since during dispersion of a thin film of propellant liquid by centrifugal force any vibration would result in ridges and holes in the film. The object is to provide by centrifugal force a constant flow of a thin film of propellant liquid inside the nozzle and outwardly towards edge 36.

Both centrifugal and electrical forces are cooperatively employed to detach liquid droplets from the cup edge blank. The charge of each detached droplet is that which it carries on its surface as it is flung off by centrifugal force. In conventional electrostatic painting nozzles, the charge of each droplet is due in part to this phenomena but in greater part to the impingement of the drop by electrons after the drop formation. Electrostatic painting is accomplished, of course, in air which cannot sustain a high intensity electric field without ionization. Therefore, in the electrostatic painting operation there is constant ionization about the edge of the rotating nozzle and the paint drops acquire most of their charge while they are bombarded by electrons in the ionized zone.

According to the present invention, an electric field is created about the edge 36 of the nozzle and between this edge and the annular extracting electrode 28. Accelerating electrodes 30 are annularly configured and coaxially aligned with the respect to extracting electrode 28 and rotating nozzle 22, so that the stream of detached droplets passes through all accelerating electrodes and is accelerated by a difference of potetnial U to an exhaust velocity v, as calculated below:

We have $$v^2 = 2U\frac{e}{m}$$

with
v=exhaust velocity
U=accelerating voltage
e=charge of a colloidal particle
m=mass of a colloidal particle At present it is impractical to utilize accelerating voltages in excess of 1,000,000 volts. It is indeed preferable to limit U to about 100,000 volts. As has been pointed out by Stuhlinger et al. for each value of U there is a range of values for e/m which will result in a feasible space vehicle. This range will be between $10^3$ and $10^6$ coulombs per kilogram. Accelerating electrodes 30 may be disposed at locations and at potentials such that they do not provide for a constant accelerating field but provide an electrostatic lens effect in order to pinch the stream of charged particles. This effect, as well as the contrary divergent effect of the stream of charged particles, is discussed in Theory and Design of Electron Beams, pages 73 and 150, respectively, by J. R. Pierce, D. Van Nostrand Company, Inc., Princeton, New Jersey, 1954.

It is expected that typical space missions shall require an exhaust velocity in the range of $2 \times 10^6$ to $5 \times 10^5$ meters per second with an accelerating voltage as high as practicable, i.e. 500,000 volts. The charge to mass ratio thus required is of the order of 1,000 coulombs per kilogram to 10,000 coulombs per kilogram. This range dictates the design of the extracting electrode.

It is well known that an electrical propulsion system should utilize two beams of particles of opposite sign so as not to charge the space vehicle on one hand or the cloud of particles ejected on the other hand.

There are two possibilities: either use two engines ejecting respectively positive and negative particles, or, according to the present method, use one propulsion system 22 ejecting positive colloidal particles and a small electron accelerator 38 which would eject electrons at the same speed as that of the positive particles.

Manifestly, propulsion system components may be rearranged and substituted and various modifications of individual components may be undertaken without departing from the spirit and scope of invention, as defined in the subjoined claims.

I claim:

1. A method of developing uniformly charged liquid droplets in a space vehicle colloidal propulsion system comprising centrifugally expanding a propellant liquid into a thin film, electrically extracting liquid droplets from said film and electrically accelerating said extracted droplets.

2. A method of developing uniformly charged liquid droplets in a space vehicle colloidal propulsion system comprising centrifugally expanding propellant liquid into a thin film, electrostatically extracting liquid droplets from said film, electrostatically accelerating said extracted droplets, and separately neutralizing the charges acquired by said space vehicle and said accelerated droplets.

3. The method as in claim 2, including concentrating said droplets during acceleration by electrostatic lens means.

4. Colloidal propulsion apparatus for use in a space vehicle comprising a source of propellant liquid, a concave nozzle connected to said source of propellant and positioned at one end of a thrust chamber area, means rotating said nozzle, an annular extracting electrode coaxially positioned in said thrust chamber apart from said nozzle so as to detach propellant liquid as intensely electrified droplets and a series of accelerating electrodes coaxially disposed in said thrust chamber with respect to said introducing means and said extracting electrode and at least one electric generator connected to said extracting and accelerating electrodes maintained at such potential as to provide through said accelerating electrode an accelerating field for liquid droplets while giving each such droplet a velocity of $5 \times 10^5$ to $2 \times 10^6$ meters per second.

5. Colloidal propulsion apparatus for use in a space vehicle comprising a source of propellant liquid, a concave nozzle connected to said source of propellant and positioned at one end of a thrust chamber area, means rotating said nozzle, an annular extracting electrode coaxially positioned in said thrust chamber apart from said nozzle so as to detach from said cup propellant liquid as intensely electrified droplets, a series of accelerating electrodes, coaxially disposed in said thrust chamber with respect to said nozzle and said extracting electrode, and at least one electric generator connected to said extracting and accelerating electrodes and operated so as to maintain through said accelerating electrodes an accelerating field for liquid droplets while imparting to said droplets a velocity of $5 \times 10^5$ to $2 \times 10^6$ meters per second, and a separate electron emitting source independently positioned in said space vehicle and operated by an independent generator.

6. A colloidal propulsion apparatus as in claim 5 wherein said concave nozzle is sharp-edged.

7. A colloidal propulsion apparatus as in claim 5 wherein said accelerating electrodes are positioned about the path of extracted droplets as an electrostatic lens.

8. Colloidal propulsion apparatus as in claim 5, said extracting electrode surface being made of semi-conducting material in substantial thickness.

9. Colloidal propulsion apparatus as in claim 5, said nozzle further comprising a conducting material.

10. Colloidal propulsion apparatus as in claim 5, said nozzle further comprising an insulating material.

11. Colloidal propulsion apparatus as in claim 5, said nozzle further comprising a semi-conducting material.

12. Colloidal propulsion apparatus for use in a space vehicle comprising a source of propellant liquid, a rotating nozzle having a propellant supply channel at one end connected to said source of propellant liquid and having its interior walls configured to enhance centrifugal expansion and filming effects upon propellant liquids introduced therein, positioned at one end of a thrust chamber, means rotating said nozzle, an annular extracting electrode coaxially positioned in said thrust chamber apart from said nozzle so as to extract propellant liquid as intensely electrified droplets, a plurality of accelerating electrodes coaxially positioned with respect to said rotating cup and said extracting electrodes being maintained by said generator at such potential as to impart each extracted droplet with a velocity of $5 \times 10^5$ to $2 \times 10^6$ meters per second, a generator connected to said cup, extracting electrodes and said accelerating electrodes, and a separate neutralizer consisting of an electron accelerator interconnecting the said space vehicle exhaust and said accelerated stream of droplets.

13. Colloidal propulsion apparatus as in claim 12 wherein said nozzle open end is crescent shaped in cross-section.

14. Colloidal propulsion apparatus as in claim 12 wherein said nozzle is of half-moon shape in cross-section.

15. Colloidal propulsion apparatus as in claim 12 wherein said nozzle open end is relatively shallow and round lipped.

16. Colloidal propulsion apparatus as in claim 12 wherein said nozzle includes adjacent its supply channel a foraminous flange.

References Cited in the file of this patent

UNITED STATES PATENTS 2,880,337    Langmuir _____ Mar. 31, 1959

FOREIGN PATENTS 1,110,350    France _____ Oct. 12, 1955

OTHER REFERENCES

Reactors in Flight; Engineering; Feb. 28, 1958; Vol. 185; No. 4799; pp. 268–270.